(12) United States Patent
Thirumalaivenjamur et al.

(10) Patent No.: US 11,144,072 B2
(45) Date of Patent: Oct. 12, 2021

(54) ADAPTIVE SYSTEM AND METHOD FOR PRESENTING SPEED AND ALTITUDE RECOMMENDATIONS FOR SUPERSONIC FLIGHT

(71) Applicant: HONEYWELL INTERNATIONAL INC., Morris Plains, NJ (US)

(72) Inventors: Prashanth Thirumalaivenjamur, Bangalore (IN); Arivazhagan V, Bangalore (IN); Raghu Shamasundar, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 216 days.

(21) Appl. No.: 16/425,208

(22) Filed: May 29, 2019

(65) Prior Publication Data

US 2020/0379488 A1    Dec. 3, 2020

(51) Int. Cl.
*G05D 1/10* (2006.01)
*B64C 30/00* (2006.01)
(Continued)

(52) U.S. Cl.
CPC ............. *G05D 1/106* (2019.05); *B64C 30/00* (2013.01); *B64D 43/00* (2013.01); *G08G 5/0021* (2013.01); *G08G 5/0039* (2013.01)

(58) Field of Classification Search
USPC .......................................................... 701/3
See application file for complete search history.

(56) References Cited

U.S. PATENT DOCUMENTS 6,905,091 B2    6/2005  Berson et al.
10,049,586 B2   8/2018  Gallo Olalla
(Continued)

OTHER PUBLICATIONS

Laura M. Smith-Velazquez, Erik Theunissen, Tim Etherington, "Synthetic Vision Display with Integral Sonic Boom Predictions," Proc. SPIE 10197, Degraded Environments: Sensing, Processing, and Display 2017, 1019708 (May 5, 2017); doi: 10.1117/12.2262356. Downloaded From: https://www.spiedigitallibrary.org/conference-proceedings-of-spie on Nov. 2, 2018 Terms of Use: https://www.spiedigitallibrary.org/terms-of-use.
(Continued)

*Primary Examiner* — Tyler D Paige
(74) *Attorney, Agent, or Firm* — Lorenz & Kopf, LLP

(57) ABSTRACT

An adaptive system in an aircraft for presenting speed and altitude recommendations for supersonic flight on an aircraft display unit is provided. The system is configured to: predict, based on received aircraft sensor inputs from on board aircraft sensors, an optimum speed and altitude profile while flying in a supersonic phase of flight between a plurality of waypoints for the current aircraft model, wind conditions, and mission; and determine using a SONIC boom prediction model whether the optimum speed and altitude profile would cause an acceptable BOOM effect per a predefined BOOM effect threshold limit during flight between the plurality of waypoints, wherein a BOOM effect is a perceived sound level on land due to unrestricted supersonic flight over land, and wherein a BOOM effect threshold limit is an acceptable perceived sound level on land due to supersonic flight over land.

20 Claims, 7 Drawing Sheets

(51) Int. Cl.
*G08G 5/00* (2006.01)
*B64D 43/00* (2006.01)

(56) References Cited

U.S. PATENT DOCUMENTS

| | | | |
|---|---|---|---|
| 10,209,122 B1 | 2/2019 | Suddreth et al. | |
| 10,810,886 B2* | 10/2020 | Suddreth | G06F 30/15 |
| 2005/0098681 A1* | 5/2005 | Berson | G05D 1/106 |
| | | | 244/1 N |
| 2013/0215023 A1 | 8/2013 | Bourret et al. | |
| 2018/0134382 A1* | 5/2018 | Scholl | B64D 33/02 |
| 2019/0164436 A1* | 5/2019 | Suddreth | B64D 45/00 |
| 2019/0272762 A1* | 9/2019 | Suddreth | G08G 5/0039 |

OTHER PUBLICATIONS

Laura M. Smith-Velazquez, Erik Theunissen, "Real-time sonic boom prediction with flight guidance," Proc. SPIE 10642, Degraded Environments: Sensing, Processing, and Display 2018, 106420C (May 2, 2018); doi: 10.1117/12.2304853. Downloaded From: https://www.spiedigitallibrary.org/conference-proceedings-of-spie on Oct. 31, 2018 Terms of Use: https://www.spiedigitallibrary.org/terms-of-use.

* cited by examiner

ADAPTIVE SYSTEM AND METHOD FOR PRESENTING SPEED AND ALTITUDE RECOMMENDATIONS FOR SUPERSONIC FLIGHT

TECHNICAL FIELD

The present invention generally relates to supersonic aircraft flight, and more particularly relates to systems and methods in an aircraft for providing guidance to flight crew regarding supersonic flight over land.

BACKGROUND

Current regulations limit or prohibit flight over land that can produce a sonic boom over human population. Supersonic flight, however, can substantially reduce flight time.

Hence, it is desirable to provide systems and methods for reducing the sonic boom level experienced on the ground from supersonic flight. Furthermore, other desirable features and characteristics of the present invention will become apparent from the subsequent detailed description and the appended claims, taken in conjunction with the accompanying drawings and the foregoing technical field and background.

SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

An adaptive system in an aircraft for presenting speed and altitude recommendations for supersonic flight on an aircraft display unit is provided. The system includes one or more processors configured by programming instructions on non-transient computer readable media. The system is configured to: position, for display via a graphical display window on a display unit, a graphical representation of a travel path that includes a waypoint icon for each of a plurality of waypoints along the travel path, a graphical representation of the altitude of the terrain underneath the travel path, and an aircraft icon positioned in the graphical display window at a current altitude and a current position relative to the travel path; predict, based on received aircraft sensor inputs from on board aircraft sensors, an optimum speed and altitude profile while flying in a supersonic phase of flight between the plurality of waypoints for, but not limited to, the current aircraft model, wind conditions, and mission; and determine using a SONIC boom prediction model whether the optimum speed and altitude profile would cause an acceptable BOOM effect per a predefined BOOM effect threshold limit during flight between the plurality of waypoints, wherein a BOOM effect is a perceived sound level on land due to unrestricted supersonic flight over land, and wherein a BOOM effect threshold limit is an acceptable perceived sound level on land due to supersonic flight over land. The system is further configured to: position on the graphical display window, for a selected speed, a graphical representation of both a BOOM impact altitude profile at the current aircraft altitude and a minimum no BOOM altitude profile, wherein the BOOM impact altitude profile indicates the altitude for the selected speed at which the perceived sound level from the sonic boom is at an acceptable level, and wherein the no BOOM altitude profile indicates the minimum supersonic flight altitude for the selected speed that would result in an acceptable perceived sound level on land; and position on the graphical display window, for the selected speed, a graphical representation of a flight crew inputted proposed altitude adjustment for flight between a first plurality of the waypoints, and a graphical representation of a modified BOOM impact altitude profile based on the proposed altitude adjustment between the first plurality of the waypoints.

A method in an aircraft for presenting speed and altitude recommendations for supersonic flight on an aircraft display unit is provided. The method includes: positioning, for display via a graphical display window on a display unit, a graphical representation of a travel path that includes a waypoint icon for each of a plurality of waypoints along the travel path, a graphical representation of the altitude of the terrain underneath the travel path, and an aircraft icon positioned in the graphical display window at a current altitude and a current position relative to the travel path; predicting, based on received aircraft sensor inputs from on board aircraft sensors, an optimum speed and altitude profile while flying in a supersonic phase of flight between the plurality of waypoints for the current aircraft model, wind conditions, and mission; and determining using a SONIC boom prediction model whether the optimum speed and altitude profile would cause an acceptable BOOM effect per a predefined BOOM effect threshold limit during flight between the plurality of waypoints, wherein a BOOM effect is a perceived sound level on land due to unrestricted supersonic flight over land, and wherein a BOOM effect threshold limit is an acceptable perceived sound level on land due to supersonic flight over land. The method further includes positioning on the graphical display window, for a selected speed, a graphical representation of both a BOOM impact altitude profile at the current aircraft altitude and a minimum no BOOM altitude profile, wherein the BOOM impact altitude profile indicates the altitude for the selected speed at which the perceived sound level from the sonic boom is at an acceptable level, and wherein the no BOOM altitude profile indicates the minimum supersonic flight altitude for the selected speed that would result in an acceptable perceived sound level on land; and positioning on the graphical display window, for the selected speed, a graphical representation of a flight crew inputted proposed altitude adjustment for flight between a first plurality of the waypoints, and a graphical representation of a modified BOOM impact altitude profile based on the proposed altitude adjustment between the first plurality of the waypoints.

Furthermore, other desirable features and characteristics will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

Figure 1:
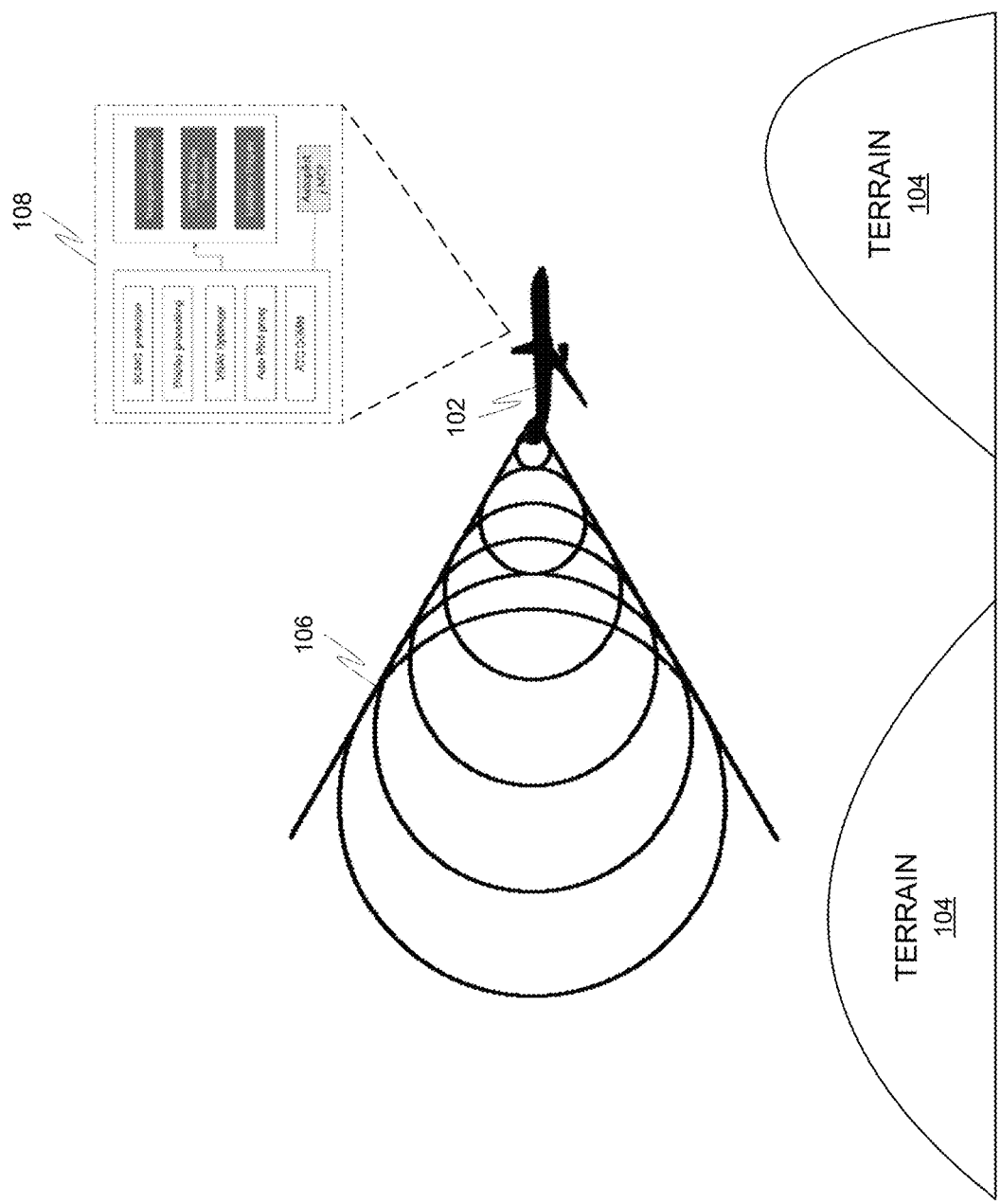
FIG. 1 is a diagram illustrating an example operating scenario for an example aircraft during supersonic flight, in accordance with some embodiments.

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, touchscreens, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The subject matter described herein discloses apparatus, systems, techniques and articles for providing speed and altitude (SPD/ALT) recommendations for supersonic flight to flight crew using an aircraft display unit. The described apparatus, systems, techniques and articles can provide speed and altitude recommendations for supersonic flight that are optimized for fuel and time efficiencies. The described apparatus, systems, techniques and articles can provide the flight crew with speed and altitude recommendations for supersonic flight that do not cause an unacceptable sonic boom noise level on the ground.

The described apparatus, systems, techniques and articles can reduce flight crew head down activity, provide Fuel/Time efficient settings, provide intuitive SPD/ALT trending graphs and alerts, provide increased situational awareness with respect to SPD/ALT references suitable for given flight situations, and identify favorable opportunities for an improved SPD/ALT profile during flight. The described apparatus, systems, techniques and articles can achieve the above-said parameters by profiling of SPD/ALT with respect to time or distance from the aircraft in a 2-dimensional graphical display from source to destination. Using an intuitive graphical interface, the flight crew can enter proposed changes to the mission speed and altitude profile and receive a graphic display indicating whether the proposed changes would allow supersonic flight with an acceptable sonic boom noise level on the ground with optimized fuel and time efficiency. The speed and altitude profile changes could originate via ATC communication or the flight crew attempting to determine a set of maneuvers manually. The described apparatus, systems, techniques and articles can provide acceptable alternative guidance to flight crew by allowing the flight crew to select economic modes of altitude, speed and vertical profile for enhanced safety and fuel efficiency with reduced flight crew workload.

FIG. 1 is a diagram illustrating an example operating scenario for an example aircraft 102 during supersonic flight. As an aircraft 102 travels over terrain 104 during supersonic flight, the aircraft 102 creates a series of pressure waves that merge into a single shock wave 106 in the shape of a geometrical cone behind the aircraft 102 that travels at the speed of sound. The shock wave 106 can affect observers that are positioned at a point that intersects a region in the shape of a geometrical cone 106 behind the aircraft 102. As the aircraft 102 moves, the conical region 106 also moves behind the aircraft 102, and when the cone 106 passes over an observer, the observer will briefly experience a sonic boom, i.e., the sound associated with the shock waves 106.

The example aircraft 102 is equipped with a system 108 that provides speed and altitude (SPD/ALT) recommendations for supersonic flight. The system is configured to evaluate a number of factors including the speed, altitude, weather, terrain, and aircraft model to determine whether the aircraft 102, if it maintained its current speed and altitude profile, would cause an acceptable sonic boom effect (e.g., perceived sound level on land due to unrestricted supersonic flight over land) on the terrain 104.

Figure 2:
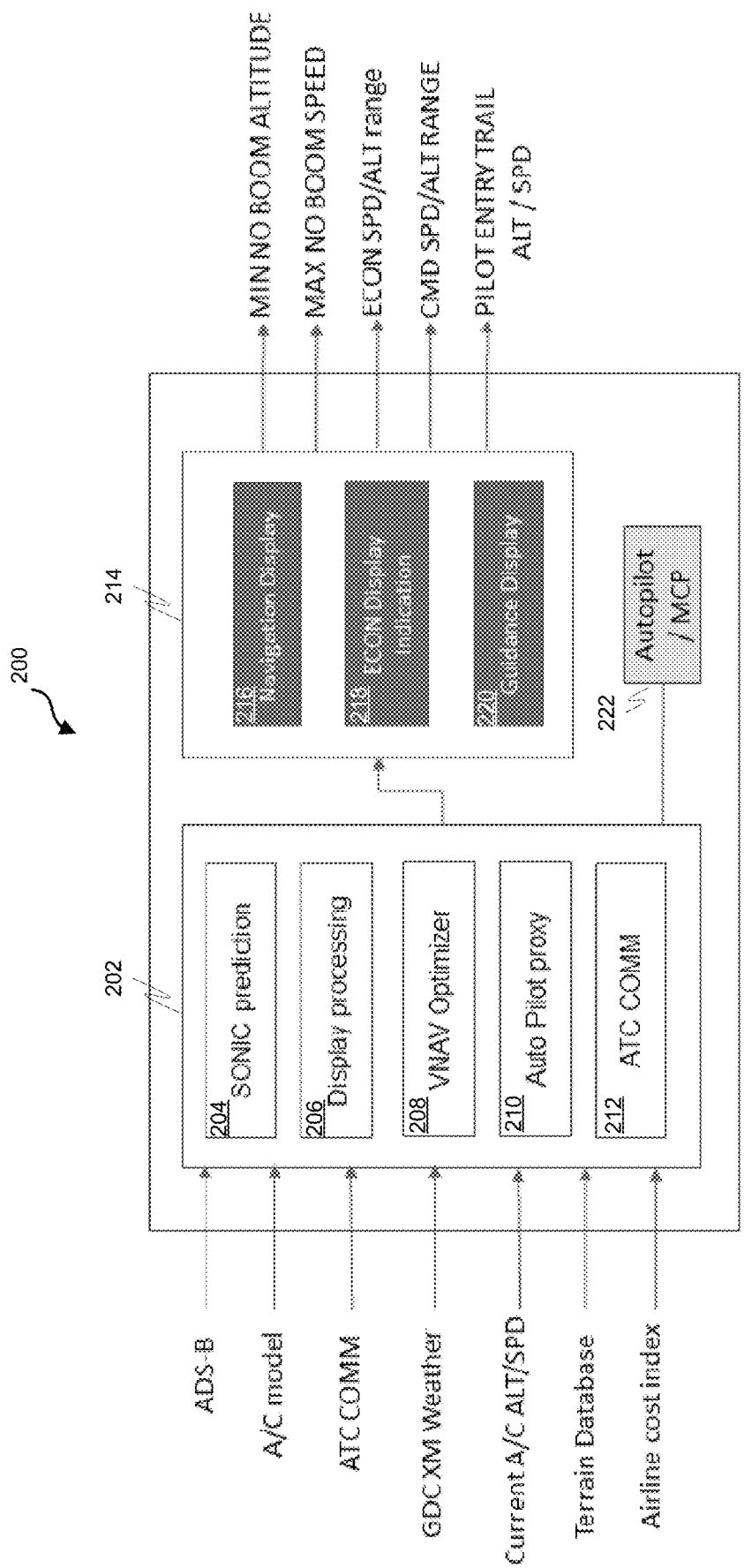
FIG. 2 is a block diagram depicting an example system in an aircraft for providing speed and altitude (SPD/ALT) recommendations for supersonic flight, in accordance with some embodiments.

FIG. 2 is a block diagram depicting an example system 202 in an aircraft 200 for providing speed and altitude (SPD/ALT) recommendations for supersonic flight. The example system 202 is configured to receive aircraft sensor inputs from on-board systems and then predict an optimum altitude and speed while flying in a supersonic phase of flight. The predicted values would be highly accurate and suitable for the current aircraft model and wind conditions. The example system 202 is configured to validate the speed and altitude profile using a SONIC prediction module 204 that, in turn, is configured to predict whether the speed and altitude profile would cause a sonic boom effect that is acceptable as per pre-defined threshold limits. The system 202 is configured to predict an economical (ECON) SPD range and/or ECON ALT range for the aircraft 200 to fly without causing an unacceptable sonic boom effect. The system 202 is configured to receive air traffic control (ATC) cleared SPD/ALT profiles and validate these profiles against SONIC prediction rules using the SONIC prediction module 204. The system 202 is configured to display speed, altitude, and acceptable sonic boom effect curves, to the flight crew for selection on a display unit. The system 202 is configured to allow proposed modifications to the SPD/ALT profile via graphical input from a touchscreen and when modifications are received the system 202 is configured to re-compute boom effect curves and display the current and predicted boom effect curves for the complete flight profile for the flight crew on the display unit. The system 202 is also configured to submit proposed modifications to the SPD/ALT profile to ATC for clearance and transmit ATC approved SPD/ALT profile modifications to the flight profile to appropriate on-board avionics systems.

The example system 202 is configured to receive aircraft sensor inputs from on board aircraft sensors and other inputs. The aircraft sensor inputs include automatic dependent surveillance broadcast (ADS-B) data, ATC communications, weather data (e.g., GDC XM weather data), and the current aircraft altitude and speed. The example system 202 is also configured to receive as input aircraft model information, terrain information from a terrain database, and airline cost information. The example system 202 is configured to output to a display unit 214 data for a navigational display 216, ECON display indication data 218, and data for a guidance display 220. The data for the navigational display 216 and guidance display 220 may include a BOOM impact altitude profile (as described below), a BOOM impact speed profile (as described below), a minimum no BOOM altitude (as described below), a maximum no BOOM speed (as described below), ECON display indication data 218 such as an optimum speed and optimum altitude calculated based on the aircraft model, weather conditions, and airline cost index, command speed and altitude range data (e.g., an ATC cleared speed and altitude profile), and pilot entry trail altitude and speed data (e.g., flight crew proposed speed and altitude profile data). The example system 202 is further configured to submit, when ATC approval is received, the flight crew inputted proposed altitude adjustment (e.g., selected independently by the flight crew or provided by ATC) and the flight crew inputted proposed speed adjustment (e.g., selected independently by the flight crew or provided by ATC) to appropriate flight systems on the aircraft (e.g., autopilot/mode control panel (MCP) 222) for implementation.

The example system 202 includes a sonic prediction module 204, a display processing module 206, a VNAV optimizer module 208, an auto pilot proxy module 210, an ATC communication module 212, and a controller (not shown) that is configured to implement the sonic prediction module 204, display processing module 206, VNAV optimizer module 208, auto pilot proxy module 210, and ATC communication module 212. The controller includes at least one processor and a computer-readable storage device or media encoded with programming instructions for configuring the controller. The processor may be any custom-made or commercially available processor, a central processing unit (CPU), a graphics processing unit (GPU), an application specific integrated circuit (ASIC), a field programmable gate array (FPGA), an auxiliary processor among several processors associated with the controller, a semiconductor-based microprocessor (in the form of a microchip or chip set), any combination thereof, or generally any device for executing instructions.

The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable programming instructions, used by the controller.

The sonic prediction module 204 is configured to predict whether a selected speed and selected altitude profile would cause an acceptable BOOM effect per a predefined BOOM effect threshold limit during flight between a plurality of waypoints, wherein a BOOM effect is a perceived sound level on land due to unrestricted supersonic flight over land, and wherein a BOOM effect threshold limit is an acceptable perceived sound level on land due to supersonic flight over land. The selected speed could be the optimum speed chosen by the system, an ATC selected speed, or a flight crew selected speed. Similarly the selected altitude may be the optimum altitude chosen by the system, an ATC selected altitude, or a flight crew selected altitude. The sonic prediction module 204 is also configured to predict whether an ATC cleared speed and altitude profile would cause an acceptable BOOM effect per predefined BOOM effect threshold limits during flight between a plurality of waypoints.

The sonic prediction module 204 is further configured to predict for a selected speed the BOOM impact altitude profile at the current altitude and the minimum no BOOM altitude profile for the selected speed, wherein the BOOM impact altitude profile indicates the altitude for the selected speed at which the perceived sound level from the sonic boom is at an acceptable level, and wherein the no BOOM altitude profile indicates the minimum supersonic flight altitude for the selected speed that would result in an acceptable perceived sound level on land. The sonic prediction module 204 is also configured to predict for a selected altitude the BOOM impact speed profile at the current speed and the maximum no BOOM speed profile for the selected altitude, wherein the BOOM impact speed profile indicates the speed for the selected altitude at which the perceived sound level from the sonic boom is at an acceptable level, and wherein the no BOOM speed profile indicates the maximum speed for the selected altitude that would result in an acceptable perceived sound level on land.

The sonic prediction module 204 is further configured to predict for a selected speed a modified BOOM impact altitude profile based on a proposed altitude adjustment between a plurality of the waypoints, wherein the modified BOOM impact altitude profile indicates the altitude for the selected speed at which the perceived sound level from the sonic boom is at an acceptable level. The sonic prediction module 204 is also configured to predict for a selected altitude a modified BOOM impact speed profile based on a proposed speed adjustment between a plurality of the waypoints, wherein the modified BOOM impact speed profile indicates the speed for the selected altitude at which the perceived sound level from the sonic boom is at an acceptable level.

The display processing module 206 is configured to perform input and output tasks for the flight crew using a display unit such as a touchscreen display unit and/or multifunction display unit. In particular, the display processing module 206 is configured to position, for display via a graphical display window on a display unit, a graphical representation of a travel path that includes a waypoint icon for each of a plurality of waypoints along the travel path, a graphical representation of the altitude of the terrain underneath the travel path, and an aircraft icon positioned in the graphical display window at a current altitude and a current position relative to the travel path.

The display processing module 206 is configured to position on the graphical display window, for a selected speed, a graphical representation of both a BOOM impact altitude profile at the current aircraft altitude and a minimum no BOOM altitude profile. The display processing module 206 is also configured to position on the graphical display window, for a selected altitude, a graphical representation of both a BOOM impact speed profile at the current aircraft speed and a maximum no BOOM speed profile.

The display processing module 206 is further configured to receive a flight crew inputted proposed altitude adjustment between a plurality of waypoints for flight for the selected speed; and position on the graphical display window, for the selected speed, a graphical representation of the flight crew inputted proposed altitude adjustment for flight between the plurality of waypoints and a graphical representation of a modified BOOM impact altitude profile based on the proposed altitude adjustment between the plurality of waypoints. The display processing module 206 is also configured to receive a flight crew inputted proposed speed adjustment between a plurality of waypoints for flight for the selected altitude; and position on the graphical display window, for the selected altitude, a graphical representation of the flight crew inputted proposed speed adjustment for flight between the plurality of waypoints, and a graphical representation of a modified BOOM impact speed profile based on the proposed speed adjustment between the plurality of waypoints. The display processing module 206 is further configured to receive the flight crew inputted proposed altitude adjustment and the flight crew inputted proposed speed adjustment by touch gestures via the graphical display window.

The display processing module 206 is further configured to display, on the display unit, the flight crew inputted proposed altitude adjustment and the flight crew inputted proposed speed adjustment for flight crew selection for submission for ATC clearance. The display processing module 206 is also configured to adjust the scaling of the graphical display window using pinch and zoom touch gestures.

The VNAV optimizer module 208 is configured to predict, based on received aircraft sensor inputs from on board aircraft sensors, an optimum speed and altitude profile while flying in a supersonic phase of flight between a plurality of waypoints for the current aircraft model, wind conditions, and mission.

The auto pilot proxy module 210 is configured to submit, when ATC approval is received, the flight crew inputted proposed altitude adjustment (e.g., selected independently by the flight crew or provided by ATC) and the flight crew inputted proposed speed adjustment (e.g., selected independently by the flight crew or provided by ATC) to appropriate flight systems on the aircraft for implementation.

The ATC communication module 212 is configured to submit a new flight plan to ATC for clearance that includes the flight crew inputted proposed altitude adjustment and the flight crew inputted proposed speed adjustment for ATC clearance.

The example system 202 is configured to present the profiling of SPD/ALT with respect to time or distance from the aircraft in a 2-dimensional graphical display from source to destination. Using an intuitive graphical interface the flight crew can perform changes to the predicted speed and altitude profile. The changes could be originated via (a) ATC communication or (b) flight crew trying to determine a set of maneuvers manually. The example system 202 can provide "Speed Situational Awareness", a "Speed Trend Alert and monitor", "Altitude Situational Awareness" and an "Altitude Trend Alert and monitor".

Figure 3:
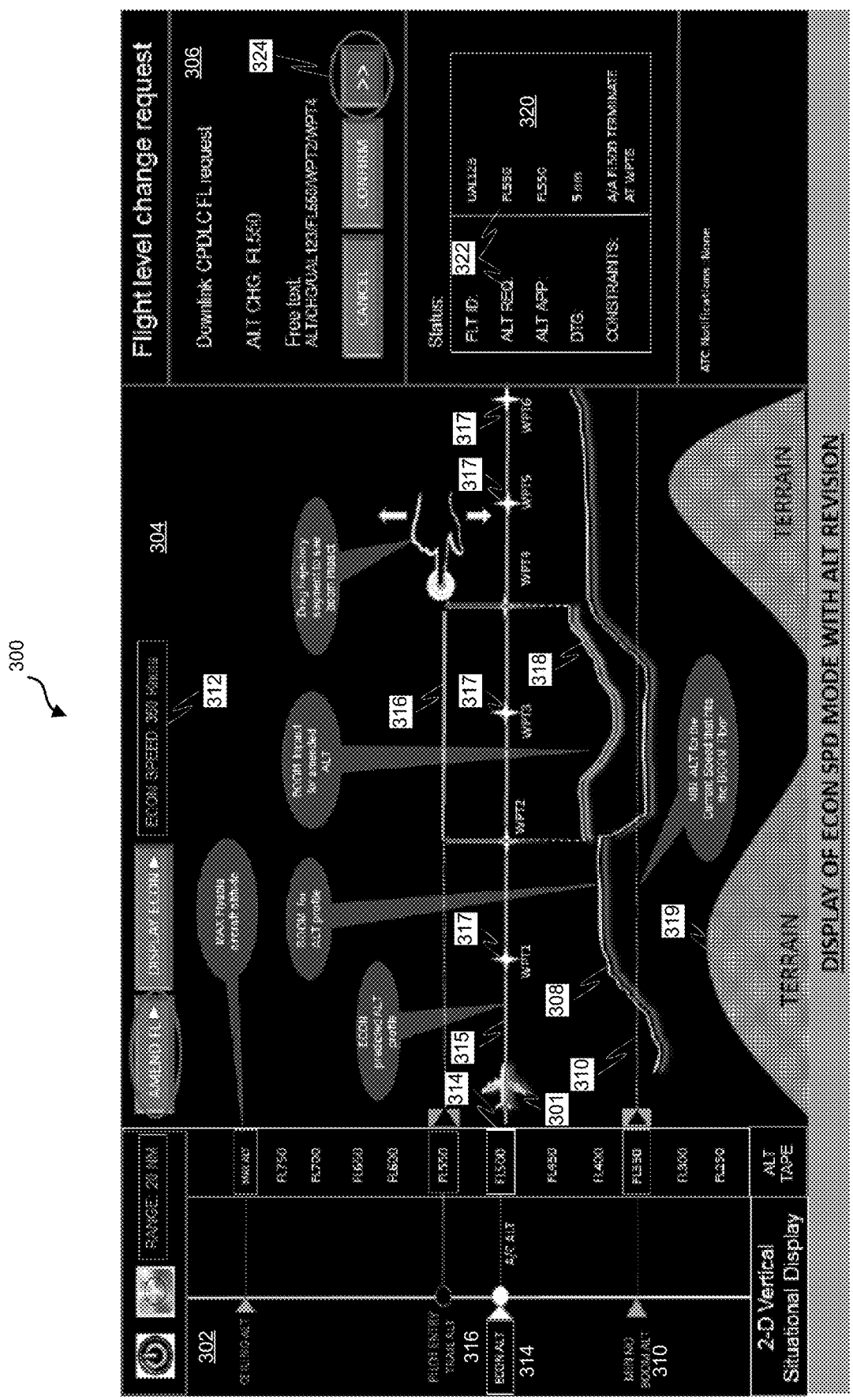
FIG. 3 is a diagram depicting an example user interface for a system that provides speed and altitude recommendations for supersonic flight, in accordance with some embodiments.

FIG. 3 is a diagram depicting an example user interface 300 for a system that provides speed and altitude recommendations for supersonic flight. The example user interface 300 illustrates the provision of a vertical situational display for econ speed mode and altitude level revisions. In this scenario, the flight crew is assumed to be flying in the ECON Speed mode (at 350 Knots) and is trying to perform an altitude level change. This may be due to favorable conditions existing at a different altitude level. In this example, the flight crew would like to change the altitude from FL500 to FL550. At this stage, the flight crew would like to know whether the selected altitude changes would result in an unacceptable sonic BOOM on the earth surface at the current aircraft speed. FIG. 3 illustrates flight crew actions for altitude level changes with respect to the current altitude profile and the subsequent verification of the sonic BOOM impact and corresponding down path altitude profile impacts. The flight crew may subsequently initiate a request to ATC for the proposed change if the proposed change has an acceptable sonic boom impact.

The example user interface 300 includes a left window pane 302, a center window pane 304, and a right window pane 306. An example BOOM impact altitude profile 308, an example minimum no BOOM altitude 310, an example ECON speed 312, an example ECON altitude 314 along a travel path 315 that includes waypoint icons 317, an example pilot entry trail altitude (e.g., flight crew proposed altitude profile change) 316, an example modified BOOM impact altitude profile 318, aircraft icon 301, and the terrain 319 are displayed in the center window pane 306. The example minimum no BOOM altitude 310, example ECON altitude 314, and example pilot entry trail altitude 316 are also displayed in the left window pane 302. The right window pane 306 displays a status chart 320 that shows the proposed altitude change 322 and a button 324 that when selected causes the proposed altitude change to be sent to ATC for approval.

Figure 4:
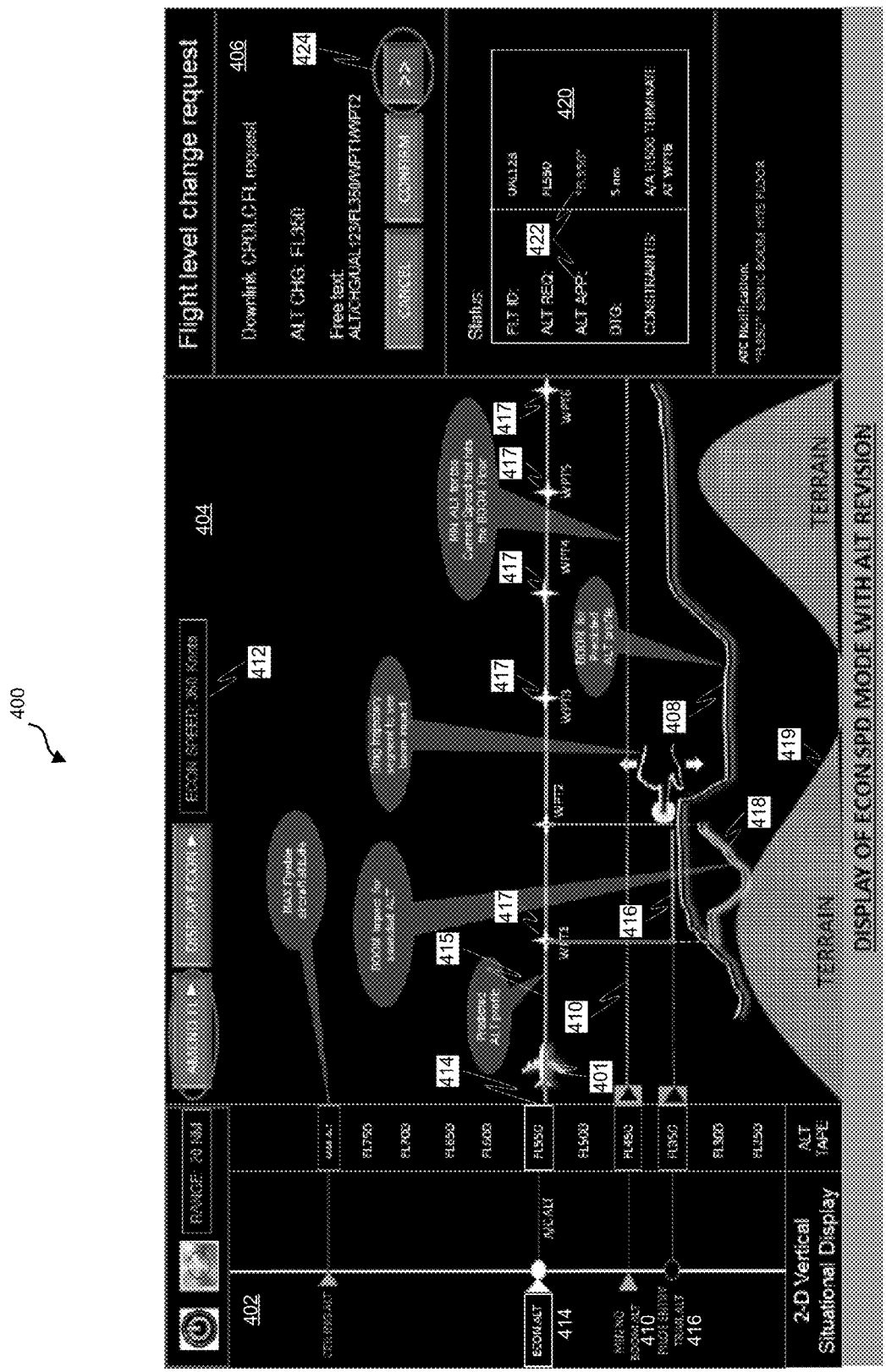
FIG. 4 is a diagram depicting another example user interface for a system that provides speed and altitude recommendations for supersonic flight, in accordance with some embodiments.

FIG. 4 is a diagram depicting an example user interface 400 for a system that provides speed and altitude recommendations for supersonic flight. The example user interface 400 illustrates the provision of a vertical situational display for econ speed mode and altitude level revisions. In this scenario, the flight crew is assumed to be flying in the ECON Speed mode (at 350 Knots) and is trying to perform an altitude level change. This may be due to favorable conditions existing at a different altitude level. In this example, the flight crew would like to change the altitude from FL500 to FL350. At this stage, the flight crew would like to know whether the altitude changes would result in an unacceptable sonic BOOM on the earth surface at the current aircraft speed. FIG. 4 illustrates flight crew actions for altitude level changes with respect to the current altitude profile and the subsequent verification of the sonic BOOM impact and corresponding down path altitude profile impacts. The flight crew may subsequently initiate a request to ATC for the proposed change if the proposed change has an acceptable sonic boom impact.

The example user interface 400 includes a left window pane 402, a center window pane 404, and a right window pane 406. An example BOOM impact altitude profile 408, an example minimum no BOOM altitude 410, an example ECON speed 412, an example ECON altitude 414 along a travel path 415 that includes waypoint icons 417, an example pilot entry trail altitude (e.g., flight crew proposed altitude profile change) 416, an example modified BOOM impact altitude profile 418, aircraft icon 401, and the terrain 419 are displayed in the center window pane 406. The example minimum no BOOM altitude 410, example ECON altitude 414, and example pilot entry trail altitude 416 are also displayed in the left window pane 402. The right window pane 406 displays a status chart 420 that shows the proposed altitude change 422 and a button 424 that when selected causes the proposed altitude change to be sent to ATC for approval.

FIGS. 3 and 4 also illustrate altitude situational awareness. While the aircraft is flying at a specific supersonic speed, the system provides situational awareness of the corresponding altitude limits to the flight crew with which the aircraft could possibly fly without causing any sonic BOOM impact on the underlying terrain. In particular, the system displays the minimum no boom altitude limits 310, 410, which are the altitude limit references at which the aircraft could fly to avoid an unacceptable sonic BOOM on the surface of the terrain below the aircraft. The system, via the display 300, 400, can provide guidance via the ECON altitude 314, 414 per the current terrain condition, a measure of the deviation of current aircraft altitude with respect to the ECON altitude, and the minimum altitude at which the aircraft can fly without causing any unacceptable sonic BOOM on the earth surface (the minimum no boom altitude limits 310, 410). The system, via the display 300, 400, can also provide guidance regarding the extent a proposed altitude profile modification 316, 416 or a current aircraft state would impact the predicted sonic BOOM and/or down path propagation of the altitude profile.

Additionally, apart from the situational display, the system is configured to provide a trend of the altitude profile 314, 414 which is computed based on the variation of the underlying terrain, aircraft acceleration, change in wind and/or change in path along the flight trajectory. The graphical display 300, 400 presents an easily editable altitude profile 314, 414 to the flight crew. This allows the flight crew to perform graphical revisions on the profile 314, 414 and simultaneously view the trend of terrain and sonic BOOM impacts. This further helps to identify favorable opportunities to make profile changes to achieve flight efficiency, meet the required scheduled time of arrival, improve fuel efficiency and increase safety with supersonic flights. Also, when ATC commands altitude profile changes the flight crew can quickly verify the sonic BOOM impacts and revise the flight plan accordingly.

Figure 5:
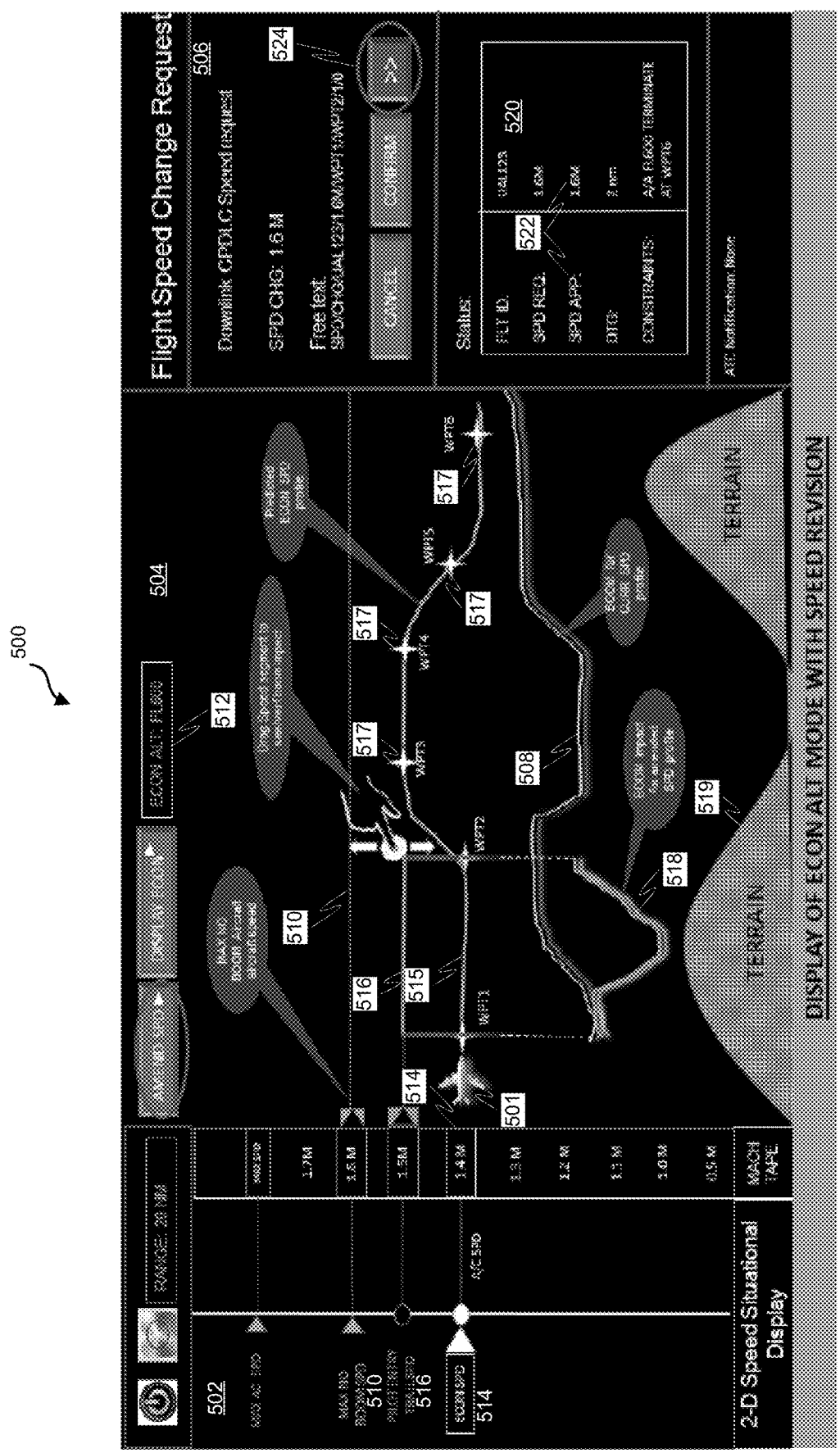
FIG. 5 is a diagram depicting another example user interface for a system that provides speed and altitude recommendations for supersonic flight, in accordance with some embodiments.

FIG. 5 is a diagram depicting an example user interface 500 for a system that provides speed and altitude recommendations for supersonic flight. The example user interface 500 illustrates the provision of a speed situational display for econ altitude mode and speed level revisions. In this scenario, the flight crew is assumed to be flying in the ECON altitude mode at FL600 and is trying to perform a speed change during the flight to possibly meet a scheduled time of arrival or utilize favorable TAIL wind conditions for better fuel savings. In this example, the flight crew would like to change the speed from 1.4 M to 1.5 M. At this stage, the flight crew would like to know whether the speed changes would result in an unacceptable sonic BOOM on the earth surface or if the down path propagation of the modified speed profile is achievable or will result in a steep profile causing passenger discomfort. FIG. 5 illustrates flight crew actions for the speed level changes with respect to current speed profile and the subsequent verification of the sonic BOOM impact and corresponding down path speed profile impacts. The flight crew may subsequently initiate a request to ATC for the proposed change if the proposed change has an acceptable sonic boom impact.

The example user interface 500 includes a left window pane 502, a center window pane 504, and a right window pane 506. An example BOOM impact speed profile 508, an example maximum no BOOM speed 510, an example ECON altitude 512, an example ECON speed profile 514 along a travel path 515 that includes waypoint icons 517, an example pilot entry trail speed (e.g., flight crew proposed speed profile change) 516, an example modified BOOM impact speed profile 518, aircraft icon 501, and the terrain 519 are displayed in the center window pane 506. The example maximum no BOOM speed 510, example ECON speed 514, and example pilot entry trail speed 516 are also displayed in the left window pane 502. The right window pane 506 displays a status chart 520 that shows the proposed speed change 522 and a button 524 that when selected causes the proposed speed change to be sent to ATC for approval.

Figure 6:
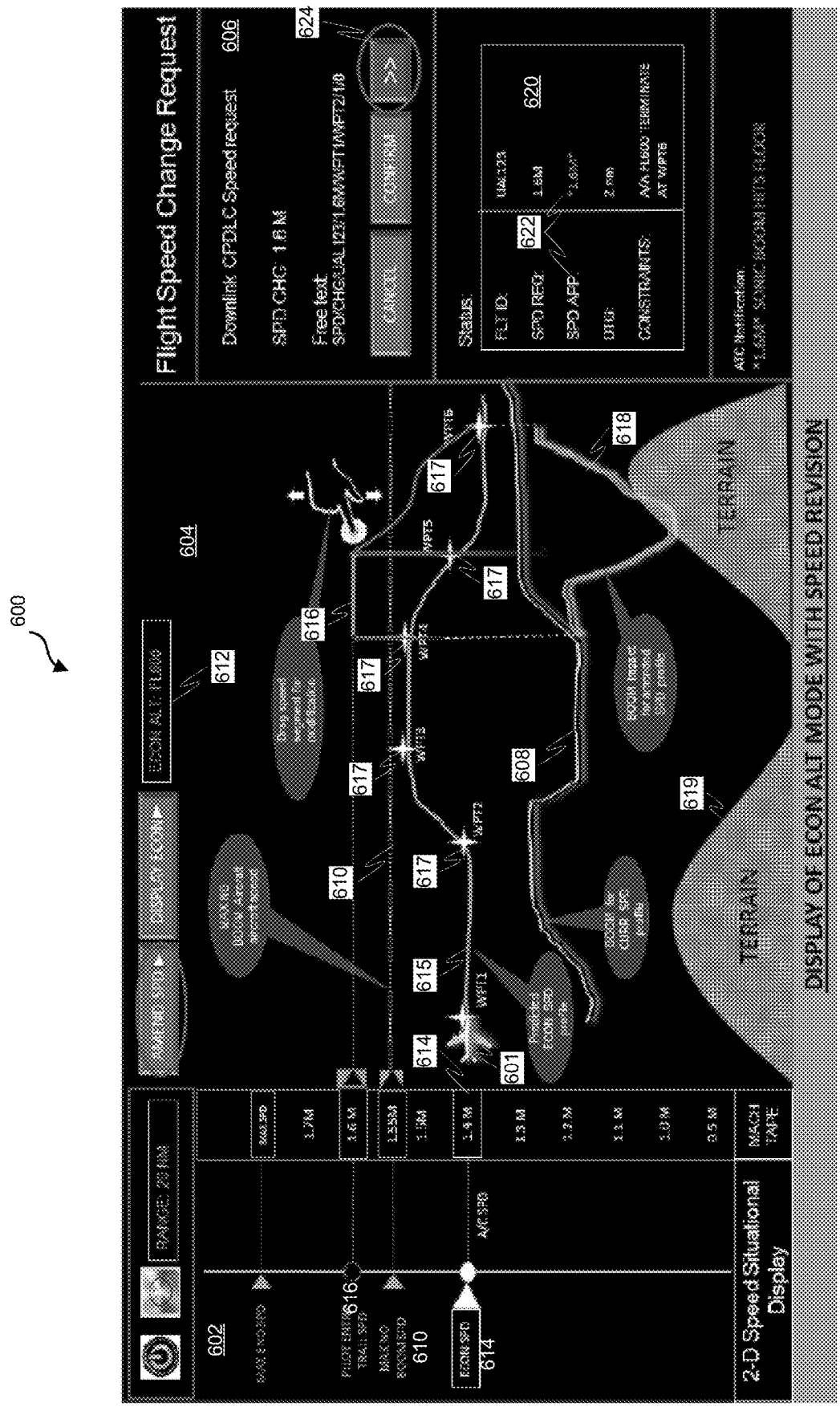
FIG. 6 is a diagram depicting another example user interface for a system that provides speed and altitude recommendations for supersonic flight, in accordance with some embodiments.

FIG. 6 is a diagram depicting an example user interface 600 for a system that provides speed and altitude recommendations for supersonic flight. The example user interface 600 illustrates the provision of a speed situational display for econ altitude mode and speed level revisions. In this scenario, the flight crew is assumed to be flying in the ECON altitude mode at FL600 and is trying to perform a speed change during the flight to possibly meet a scheduled time of arrival or utilize favorable TAIL wind conditions for better fuel savings. In this example, the flight crew would like to change the speed from 1.5 M to 1.6 M. At this stage, the flight crew would like to know whether the speed changes would result in an unacceptable sonic BOOM on the earth surface or if the down path propagation of the modified speed profile is achievable or will result in a steep profile causing passenger discomfort. FIG. 6 illustrates flight crew actions for the speed level changes with respect to current speed profile and the subsequent verification of the sonic BOOM impact and corresponding down path speed profile impacts. The flight crew may subsequently initiate a request to ATC for the proposed change if the proposed change has an acceptable sonic boom impact.

The example user interface 600 includes a left window pane 602, a center window pane 604, and a right window pane 606. An example BOOM impact speed profile 608, an example maximum no BOOM speed 610, an example ECON altitude 612, an example ECON speed profile 614 along a travel path 615 that includes waypoint icons 617, an example pilot entry trail speed (e.g., flight crew proposed speed profile change) 616, an example modified BOOM impact speed profile 618, aircraft icon 601, and the terrain 619 are displayed in the center window pane 606. The example maximum no BOOM speed 610, example ECON speed 614, and example pilot entry trail speed 616 are also displayed in the left window pane 602. The right window pane 606 displays a status chart 620 that shows the proposed speed change 622 and a button 624 that when selected causes the proposed speed change to be sent to ATC for approval.

FIGS. 5 and 6 also illustrate speed situational awareness. While the aircraft is flying at a supersonic speed at a given altitude, the system provides situational awareness of the corresponding speed limits to the flight crew with which the aircraft could possibly fly without causing any sonic BOOM impact on the underlying terrain. In particular, the system displays the maximum no boom speed limits 510, 610, which are the speed limit references at which the aircraft could fly to avoid an unacceptable sonic BOOM on the surface of the terrain below the aircraft. The system, via the display 500, 600, can provide guidance via the ECON speed 514, 614 per the current terrain condition, a measure of the deviation of current aircraft speed with respect to the ECON speed, and the maximum speed at which the aircraft can fly without causing any BOOM on the earth surface (the maximum no boom speed limits 510, 610). The system, via the display 500, 600, can also provide guidance regarding the extent a proposed speed profile modification 516, 616 or a current aircraft state would impact the predicted sonic BOOM and/or down path propagation of the speed profile.

Additionally, apart from the situational display, the system is configured to provide a trend of the speed profile 514, 614 which is computed based on the variation of the underlying terrain, aircraft acceleration, change in wind and/or change in path along the flight trajectory. The graphical display 500, 600 presents an easily editable speed profile 514, 614 to the flight crew. This allows the flight crew to perform graphical revisions on the profile 514, 614 and simultaneously view the trend of terrain and sonic BOOM impacts. This further helps to identify favorable opportunities to make profile changes to achieve flight efficiency, meet the required scheduled time of arrival, improve fuel efficiency and increase safety with supersonic flights. Also, when ATC commands speed profile changes the flight crew can quickly verify the sonic BOOM impacts and revise the flight plan accordingly.

Figure 7:
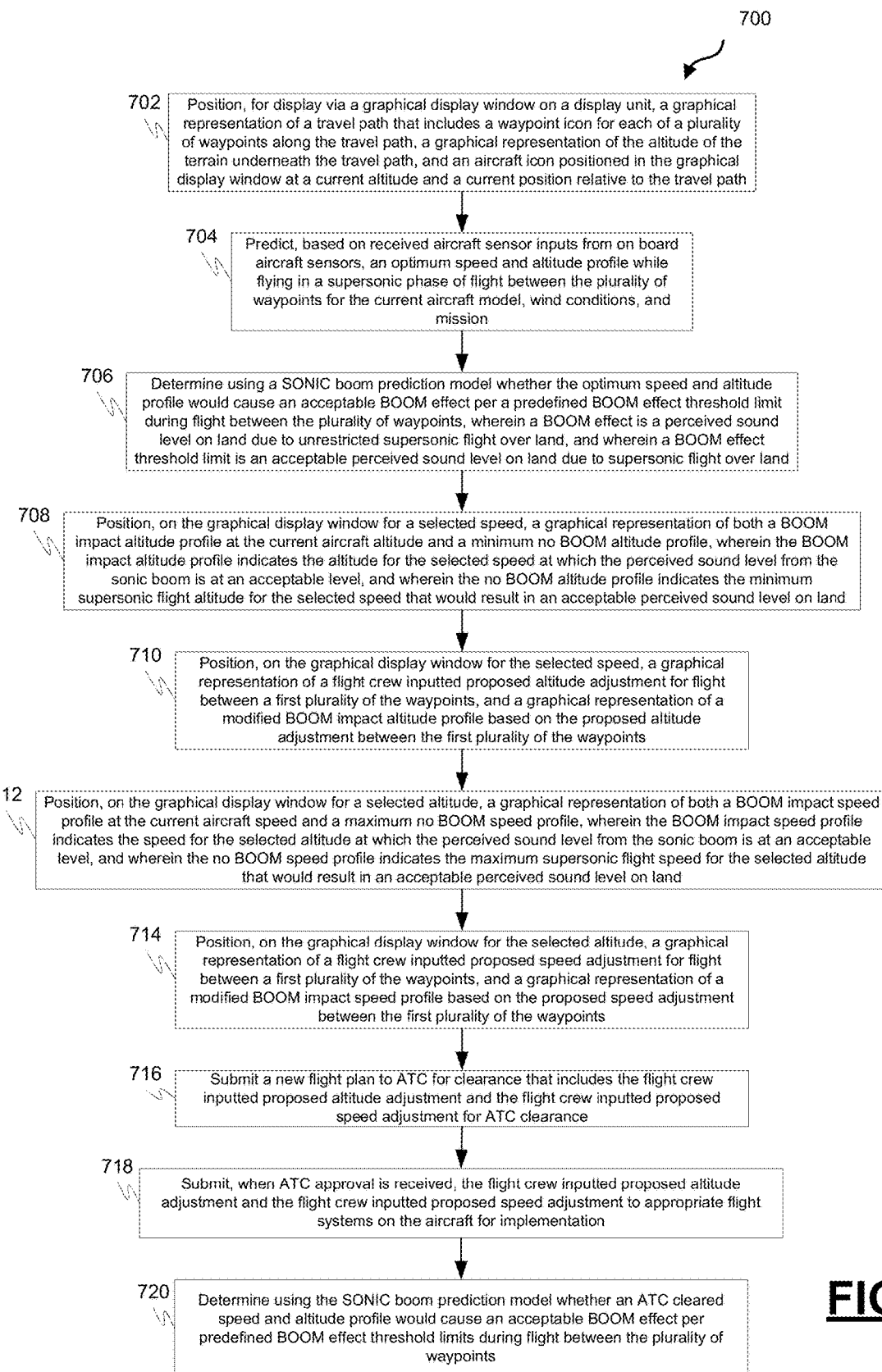
FIG. 7 is a process flow chart depicting an example process in an aircraft for providing speed and altitude recommendations for supersonic flight, in accordance with some embodiments.

FIG. 7 is a process flow chart depicting an example process 700 in an aircraft for providing speed and altitude recommendations for supersonic flight. The order of operation within the process is not limited to the sequential execution as illustrated in the figure, but may be performed in one or more varying orders as applicable and in accordance with the present disclosure.

The example process 700 includes positioning, for display via a graphical display window on a display unit, a graphical representation of a travel path that includes a waypoint icon for each of a plurality of waypoints along the travel path, a graphical representation of the altitude of the terrain underneath the travel path, and an aircraft icon positioned in the graphical display window at a current altitude and a current position relative to the travel path (operation 702).

The example process 700 includes predicting, based on received aircraft sensor inputs from on board aircraft sensors, an optimum speed and altitude profile while flying in a supersonic phase of flight between the plurality of waypoints for the current aircraft model, wind conditions, and mission (operation 704).

The example process 700 includes determining using a SONIC boom prediction model whether the optimum speed and altitude profile would cause an acceptable BOOM effect per a predefined BOOM effect threshold limit during flight between the plurality of waypoints, wherein a BOOM effect is a perceived sound level on land due to unrestricted supersonic flight over land, and wherein a BOOM effect threshold limit is an acceptable perceived sound level on land due to supersonic flight over land (operation 706).

The example process 700 includes positioning on the graphical display window, for a selected speed, a graphical representation of both a BOOM impact altitude profile at the current aircraft altitude and a minimum no BOOM altitude profile, wherein the BOOM impact altitude profile indicates the altitude for the selected speed at which the perceived sound level from the sonic boom is at an acceptable level, and wherein the no BOOM altitude profile indicates the minimum supersonic flight altitude for the selected speed that would result in an acceptable perceived sound level on land (operation 708).

The example process 700 includes positioning on the graphical display window, for the selected speed, a graphical representation of a flight crew inputted proposed altitude adjustment for flight between a first plurality of the waypoints, and a graphical representation of a modified BOOM impact altitude profile based on the proposed altitude adjustment between the first plurality of the waypoints (operation 710). The flight crew inputted proposed altitude adjustment may be received by touch gestures via the graphical display window and displayed on the graphical display window.

The example process 700 includes positioning on the graphical display window, for a selected altitude, a graphical representation of both a BOOM impact speed profile at the current aircraft speed and a maximum no BOOM speed profile, wherein the BOOM impact speed profile indicates the speed for the selected altitude at which the perceived sound level from the sonic boom is at an acceptable level, and wherein the no BOOM speed profile indicates the maximum supersonic flight speed for the selected altitude that would result in an acceptable perceived sound level on land (operation 712).

The example process 700 includes positioning on the graphical display window, for the selected altitude, a graphical representation of a flight crew inputted proposed speed adjustment for flight between a first plurality of the waypoints, and a graphical representation of a modified BOOM impact speed profile based on the proposed speed adjustment between the first plurality of the waypoints (operation 714). The flight crew inputted proposed speed adjustment may be received by touch gestures via the graphical display window and displayed on the graphical display window.

The example process 700 includes submitting a new flight plan to ATC for clearance that includes the flight crew inputted proposed altitude adjustment and the flight crew inputted proposed speed adjustment for ATC clearance (operation 716) and submitting, when ATC approval is received, the flight crew inputted proposed altitude adjustment and the flight crew inputted proposed speed adjustment to appropriate flight systems on the aircraft for implementation (operation 718).

The example process 700 optionally includes determining using the SONIC boom prediction model whether an ATC cleared speed and altitude profile would cause an acceptable BOOM effect per predefined BOOM effect threshold limits during flight between the plurality of waypoints (operation 720).

Described herein are apparatus, systems, techniques and articles in an aircraft for providing speed and altitude recommendations for supersonic flight. The described apparatus, systems, techniques and articles can provide graphical control for monitoring the ECON ALT/SPD modes of flying in supersonic jets. A vertical situation display control can allow for the performance of intuitive revisions to vertical profile and speed profile. The described apparatus, systems, techniques and articles provides a tool that can aid flight crews to inspect revisions to a flight path.

The described apparatus, systems, techniques and articles can provide a graphical tool that can aid a pilot with situational awareness as well as providing a strategic tool for planning and inspecting flight parameters. Flight crew can use the strategic tool to look for opportunities to identify optimal changes down path in the route. This can reduce the work load and improve accuracy and quick decision making. The described apparatus, systems, techniques and articles can allow for the comparison of current parameters or ATC suggested parameters with the ECON parameter limits.

The described apparatus, systems, techniques and articles can assist the flight crew to greatly reduce validation activities. The described apparatus, systems, techniques and articles can assist with validating whether "aircraft speed", or "ATC cleared speed" is within an acceptable range for not causing unacceptable SONIC BOOM on the ground. The described apparatus, systems, techniques and articles can assist with validating whether "aircraft altitude", or "ATC cleared altitude" is within an acceptable range for not causing an unacceptable SONIC BOOM on the ground.

The described apparatus, systems, techniques and articles can reduce pilot head down activity and collates multiple data into one display for easy decision making and confirming the changes to the on-board system. The described apparatus, systems, techniques and articles can provide assistance in obtaining ATC clearance for SPD/ALT changes. The described apparatus, systems, techniques and articles can provide the flight crew in aircraft engaged in supersonic flight with speed and altitude combinations that will not result in an unacceptable sonic boom noise level on the ground underneath the aircraft. The described apparatus, systems, techniques and articles can provide a way to allow civilian aircraft to engage in supersonic flight over land populated by people without creating unacceptable sonic boom noise levels on the ground underneath the aircraft.

In one embodiment, an adaptive system in an aircraft for presenting speed and altitude recommendations for supersonic flight on an aircraft display unit is provided. The system comprises one or more processors configured by programming instructions on non-transient computer readable media. The system is configured to: position, for display via a graphical display window on a display unit, a graphical representation of a travel path that includes a waypoint icon for each of a plurality of waypoints along the travel path, a graphical representation of the altitude of the terrain underneath the travel path, and an aircraft icon positioned in the graphical display window at a current altitude and a current position relative to the travel path; predict, based on received aircraft sensor inputs from on board aircraft sensors, an optimum speed and altitude profile while flying in a supersonic phase of flight between the plurality of waypoints for the current aircraft model, wind conditions, and mission; and determine using a SONIC boom prediction model whether the optimum speed and altitude profile would cause an acceptable BOOM effect per a predefined BOOM effect threshold limit during flight between the plurality of waypoints, wherein a BOOM effect is a perceived sound level on land due to unrestricted supersonic flight over land, and wherein a BOOM effect threshold limit is an acceptable perceived sound level on land due to supersonic flight over land. The system is further configured to: position on the graphical display window, for a selected speed, a graphical representation of both a BOOM impact altitude profile at the current aircraft altitude and a minimum no BOOM altitude profile, wherein the BOOM impact altitude profile indicates the altitude for the selected speed at which the perceived sound level from the sonic boom is at an acceptable level, and wherein the no BOOM altitude profile indicates the minimum supersonic flight altitude for the selected speed that would result in an acceptable perceived sound level on land; and position on the graphical display window, for the selected speed, a graphical representation of a flight crew inputted proposed altitude adjustment for flight between a first plurality of the waypoints, and a graphical representation of a modified BOOM impact altitude profile based on the proposed altitude adjustment between the first plurality of the waypoints.

These aspects and other embodiments may include one or more of the following features. The selected speed may be the predicted optimum speed. To position a graphical representation of both the BOOM impact altitude profile and the minimum no BOOM altitude profile, the system may be configured to determine based on the selected speed and using the SONIC boom prediction model the BOOM impact altitude profile at the current altitude and the minimum no BOOM altitude profile. To position a graphical representation of a flight crew inputted proposed altitude adjustment and a graphical representation of a modified BOOM impact altitude profile based on the proposed altitude adjustment, the system may be configured to: receive a flight crew inputted proposed altitude adjustment between the first plurality of the waypoints for flight for the selected speed; and determine based on the selected speed and using the SONIC boom prediction model, a modified BOOM impact altitude profile based on the proposed altitude adjustment between the first plurality of the waypoints. The system may be further configured to: position on the graphical display window, for a selected altitude, a graphical representation of both a BOOM impact speed profile at the current aircraft speed and a maximum no BOOM speed profile, wherein the BOOM impact speed profile indicates the speed for the selected altitude at which the perceived sound level from the sonic boom is at an acceptable level, and wherein the no BOOM speed profile indicates the maximum supersonic flight speed for the selected altitude that would result in an acceptable perceived sound level on land; and position on the graphical display window, for the selected altitude, a graphical representation of a flight crew inputted proposed speed adjustment for flight between a first plurality of the waypoints, and a graphical representation of a modified BOOM impact speed profile based on the proposed speed adjustment between the first plurality of the waypoints. The selected altitude may be the predicted optimum altitude. To position a graphical representation of both the BOOM impact speed profile and the maximum no BOOM speed profile, the system may be configured to determine based on the selected altitude and using the SONIC boom prediction model the BOOM impact speed profile at the current speed and the maximum no BOOM speed profile. To position a graphical representation of a flight crew inputted proposed speed adjustment and a graphical representation of a modified BOOM impact speed profile based on the proposed speed adjustment, the system is configured to: receive a flight crew inputted proposed speed adjustment between the first plurality of the waypoints for flight for the selected altitude; and determine based on the selected altitude and using the SONIC boom prediction model, a modified BOOM impact speed profile based on the proposed speed adjustment between the first plurality of the waypoints. The system may be further configured to: receive by touch gestures via the graphical display window the flight crew inputted proposed altitude adjustment, and the flight crew inputted proposed speed adjustment; and display, on the display unit, the flight crew inputted proposed altitude adjustment and the flight crew inputted proposed speed adjustment for flight crew selection for submission for ATC clearance. The system may be further configured to: submit a new flight plan to ATC for clearance that includes the flight crew inputted proposed altitude adjustment and the flight crew inputted proposed speed adjustment for ATC clearance; and submit, when ATC approval is received, the flight crew inputted proposed altitude adjustment and the flight crew inputted proposed speed adjustment to appropriate flight systems on the aircraft for implementation. The system may be further configured to determine using the SONIC boom prediction model whether an ATC cleared speed and altitude profile would cause an acceptable BOOM effect per predefined BOOM effect threshold limits during flight between the plurality of waypoints. The system may be further configured to adjust the scaling of the graphical display window using pinch and zoom touch gestures.

In another embodiment, a method in an aircraft for presenting speed and altitude recommendations for supersonic flight on an aircraft display unit is provided. The method comprises: positioning, for display via a graphical display window on a display unit, a graphical representation of a travel path that includes a waypoint icon for each of a plurality of waypoints along the travel path, a graphical representation of the altitude of the terrain underneath the travel path, and an aircraft icon positioned in the graphical display window at a current altitude and a current position relative to the travel path; predicting, based on received aircraft sensor inputs from on board aircraft sensors, an optimum speed and altitude profile while flying in a supersonic phase of flight between the plurality of waypoints for the current aircraft model, wind conditions, and mission; and determining using a SONIC boom prediction model whether the optimum speed and altitude profile would cause an acceptable BOOM effect per a predefined BOOM effect threshold limit during flight between the plurality of waypoints, wherein a BOOM effect is a perceived sound level on land due to unrestricted supersonic flight over land, and wherein a BOOM effect threshold limit is an acceptable perceived sound level on land due to supersonic flight over land. The method further comprises positioning on the graphical display window, for a selected speed, a graphical representation of both a BOOM impact altitude profile at the current aircraft altitude and a minimum no BOOM altitude profile, wherein the BOOM impact altitude profile indicates the altitude for the selected speed at which the perceived sound level from the sonic boom is at an acceptable level, and wherein the no BOOM altitude profile indicates the minimum supersonic flight altitude for the selected speed that would result in an acceptable perceived sound level on land; and positioning on the graphical display window, for the selected speed, a graphical representation of a flight crew inputted proposed altitude adjustment for flight between a first plurality of the waypoints, and a graphical representation of a modified BOOM impact altitude profile based on the proposed altitude adjustment between the first plurality of the waypoints.

These aspects and other embodiments may include one or more of the following features. The method may further comprise: positioning on the graphical display window, for a selected altitude, a graphical representation of both a BOOM impact speed profile at the current aircraft speed and a maximum no BOOM speed profile, wherein the BOOM impact speed profile indicates the speed for the selected altitude at which the perceived sound level from the sonic boom is at an acceptable level, and wherein the no BOOM speed profile indicates the maximum supersonic flight speed for the selected altitude that would result in an acceptable perceived sound level on land; and positioning on the graphical display window, for the selected altitude, a graphical representation of a flight crew inputted proposed speed adjustment for flight between a first plurality of the waypoints, and a graphical representation of a modified BOOM impact speed profile based on the proposed speed adjustment between the first plurality of the waypoints. The method may further comprise: receiving by touch gestures via the graphical display window the flight crew inputted proposed altitude adjustment, and the flight crew inputted proposed speed adjustment; and displaying, on the display unit, the flight crew inputted proposed altitude adjustment and the flight crew inputted proposed speed adjustment for flight crew selection for submission for ATC clearance. The method may further comprise: submitting a new flight plan to ATC for clearance that includes the flight crew inputted proposed altitude adjustment and the flight crew inputted proposed speed adjustment for ATC clearance; and submitting, when ATC approval is received, the flight crew inputted proposed altitude adjustment and the flight crew inputted proposed speed adjustment to appropriate flight systems on the aircraft for implementation. The method may further comprise determining using the SONIC boom prediction model whether an ATC cleared speed and altitude profile would cause an acceptable BOOM effect per predefined BOOM effect threshold limits during flight between the plurality of waypoints.

In another embodiment, non-transient computer readable media configured by programming instructions to perform a method is provided. The method comprises: positioning, for display via a graphical display window on a display unit, a graphical representation of a travel path that includes a waypoint icon for each of a plurality of waypoints along the travel path, a graphical representation of the altitude of the terrain underneath the travel path, and an aircraft icon positioned in the graphical display window at a current altitude and a current position relative to the travel path; predicting, based on received aircraft sensor inputs from on board aircraft sensors, an optimum speed and altitude profile while flying in a supersonic phase of flight between the plurality of waypoints for the current aircraft model, wind conditions, and mission; and determining using a SONIC boom prediction model whether the optimum speed and altitude profile would cause an acceptable BOOM effect per a predefined BOOM effect threshold limit during flight between the plurality of waypoints, wherein a BOOM effect is a perceived sound level on land due to unrestricted supersonic flight over land, and wherein a BOOM effect threshold limit is an acceptable perceived sound level on land due to supersonic flight over land. The method further comprises positioning on the graphical display window, for a selected speed, a graphical representation of both a BOOM impact altitude profile at the current aircraft altitude and a minimum no BOOM altitude profile, wherein the BOOM impact altitude profile indicates the altitude for the selected speed at which the perceived sound level from the sonic boom is at an acceptable level, and wherein the no BOOM altitude profile indicates the minimum supersonic flight altitude for the selected speed that would result in an acceptable perceived sound level on land; and positioning on the graphical display window, for the selected speed, a graphical representation of a flight crew inputted proposed altitude adjustment for flight between a first plurality of the waypoints, and a graphical representation of a modified BOOM impact altitude profile based on the proposed altitude adjustment between the first plurality of the waypoints.

These aspects and other embodiments may include one or more of the following features. The method may further comprise: positioning on the graphical display window, for a selected altitude, a graphical representation of both a BOOM impact speed profile at the current aircraft speed and a maximum no BOOM speed profile, wherein the BOOM impact speed profile indicates the speed for the selected altitude at which the perceived sound level from the sonic boom is at an acceptable level, and wherein the no BOOM speed profile indicates the maximum supersonic flight speed for the selected altitude that would result in an acceptable perceived sound level on land; and positioning on the graphical display window, for the selected altitude, a graphical representation of a flight crew inputted proposed speed adjustment for flight between a first plurality of the waypoints, and a graphical representation of a modified BOOM impact speed profile based on the proposed speed adjustment between the first plurality of the waypoints. The method may further comprise: receiving by touch gestures via the graphical display window the flight crew inputted proposed altitude adjustment, and the flight crew inputted proposed speed adjustment; displaying, on the display unit, the flight crew inputted proposed altitude adjustment and the flight crew inputted proposed speed adjustment for flight crew selection for submission for ATC clearance; submitting a new flight plan to ATC for clearance that includes the flight crew inputted proposed altitude adjustment and the flight crew inputted proposed speed adjustment for ATC clearance; submitting, when ATC approval is received, the flight crew inputted proposed altitude adjustment and the flight crew inputted proposed speed adjustment to appropriate flight systems on the aircraft for implementation; and determining using the SONIC boom prediction model whether an ATC cleared speed and altitude profile would cause an acceptable BOOM effect per predefined BOOM effect threshold limits during flight between the plurality of waypoints.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An adaptive system in an aircraft for presenting speed and altitude recommendations for supersonic flight on an aircraft display unit, the system comprising a controller configured to:
    position, for display via a graphical display window on the aircraft display unit, a graphical representation of a travel path that includes a waypoint icon for each of a plurality of waypoints along the travel path, a graphical representation of the altitude of terrain underneath the travel path, and an aircraft icon positioned in the graphical display window at a current altitude and a current position relative to the travel path;
    predict, based on received aircraft sensor inputs from on board aircraft sensors, an optimum speed and altitude profile while flying in a supersonic phase of flight between the plurality of waypoints for a current aircraft model, wind conditions, and mission;
    determine using a SONIC boom prediction model whether the optimum speed and altitude profile would cause an acceptable BOOM effect per a predefined BOOM effect threshold limit during flight between the plurality of waypoints, wherein a BOOM effect is a perceived sound level on land due to unrestricted supersonic flight over land, and wherein a BOOM effect threshold limit is an acceptable perceived sound level on land due to supersonic flight over land;
    position on the graphical display window, for a selected speed, a graphical representation of both a BOOM impact altitude profile at the current aircraft altitude and a minimum no BOOM altitude profile, wherein the BOOM impact altitude profile indicates the altitude for the selected speed at which the perceived sound level from the sonic boom is at an acceptable level, and wherein the no BOOM altitude profile indicates the minimum supersonic flight altitude for the selected speed that would result in an acceptable perceived sound level on land; and
    position on the graphical display window, for the selected speed, a graphical representation of a flight crew inputted proposed altitude adjustment for flight between a first plurality of the waypoints, and a graphical representation of a modified BOOM impact altitude profile based on the proposed altitude adjustment between the first plurality of the waypoints.

2. The system of claim 1, wherein the selected speed is the predicted optimum speed.

3. The system of claim 1, wherein to position a graphical representation of both the BOOM impact altitude profile and the minimum no BOOM altitude profile, the system is configured to determine based on the selected speed and using the SONIC boom prediction model the BOOM impact altitude profile at the current altitude and the minimum no BOOM altitude profile.

4. The system of claim 1, wherein to position a graphical representation of a flight crew inputted proposed altitude adjustment and a graphical representation of a modified BOOM impact altitude profile based on the proposed altitude adjustment, the system is configured to:
    receive a flight crew inputted proposed altitude adjustment between the first plurality of the waypoints for flight for the selected speed; and
    determine based on the selected speed and using the SONIC boom prediction model, a modified BOOM impact altitude profile based on the proposed altitude adjustment between the first plurality of the waypoints.

5. The system of claim 1, further configured to:
    position on the graphical display window, for a selected altitude, a graphical representation of both a BOOM impact speed profile at the current aircraft speed and a maximum no BOOM speed profile, wherein the BOOM impact speed profile indicates the speed for the selected altitude at which the perceived sound level from the sonic boom is at an acceptable level, and wherein the no BOOM speed profile indicates a maximum supersonic flight speed for the selected altitude that would result in an acceptable perceived sound level on land; and
    position on the graphical display window, for the selected altitude, a graphical representation of a flight crew inputted proposed speed adjustment for flight between a first plurality of the waypoints, and a graphical representation of a modified BOOM impact speed profile based on the proposed speed adjustment between the first plurality of the waypoints.

6. The system of claim 1, wherein the selected altitude is the predicted optimum altitude.

7. The system of claim 1, wherein to position a graphical representation of both the BOOM impact speed profile and the maximum no BOOM speed profile, the system is configured to determine based on the selected altitude and using the SONIC boom prediction model the BOOM impact speed profile at the current speed and the maximum no BOOM speed profile.

8. The system of claim 1, wherein to position a graphical representation of a flight crew inputted proposed speed adjustment and a graphical representation of a modified BOOM impact speed profile based on the proposed speed adjustment, the system is configured to:
    receive a flight crew inputted proposed speed adjustment between the first plurality of the waypoints for flight for the selected altitude; and
    determine based on the selected altitude and using the SONIC boom prediction model, a modified BOOM impact speed profile based on the proposed speed adjustment between the first plurality of the waypoints.

9. The system of claim 5 further configured to:
    receive by touch gestures via the graphical display window the flight crew inputted proposed altitude adjustment, and the flight crew inputted proposed speed adjustment; and
    display, on the aircraft display unit, the flight crew inputted proposed altitude adjustment and the flight crew inputted proposed speed adjustment for flight crew selection for submission for ATC clearance.

10. The system of claim 5 further configured to:
    submit a new flight plan to ATC for clearance that includes the flight crew inputted proposed altitude adjustment and the flight crew inputted proposed speed adjustment for ATC clearance; and
    submit, when ATC approval is received, the flight crew inputted proposed altitude adjustment and the flight crew inputted proposed speed adjustment to appropriate flight systems on the aircraft for implementation.

11. The system of claim 1 further configured to determine using the SONIC boom prediction model whether an ATC cleared speed and altitude profile would cause an acceptable BOOM effect per predefined BOOM effect threshold limits during flight between the plurality of waypoints.

12. The system of claim 1 further configured to adjust the scaling of the graphical display window using pinch and zoom touch gestures.

13. A method in an aircraft for presenting speed and altitude recommendations for supersonic flight on an aircraft display unit, the method comprising:
    positioning, for display via a graphical display window on the aircraft display unit, a graphical representation of a travel path that includes a waypoint icon for each of a plurality of waypoints along the travel path, a graphical representation of the altitude of terrain underneath the travel path, and an aircraft icon positioned in the graphical display window at a current altitude and a current position relative to the travel path;
    predicting, based on received aircraft sensor inputs from on board aircraft sensors, an optimum speed and altitude profile while flying in a supersonic phase of flight between the plurality of waypoints for a current aircraft model, wind conditions, and mission;
    determining using a SONIC boom prediction model whether the optimum speed and altitude profile would cause an acceptable BOOM effect per a predefined BOOM effect threshold limit during flight between the plurality of waypoints, wherein a BOOM effect is a perceived sound level on land due to unrestricted supersonic flight over land, and wherein a BOOM effect threshold limit is an acceptable perceived sound level on land due to supersonic flight over land;
    positioning on the graphical display window, for a selected speed, a graphical representation of both a BOOM impact altitude profile at the current aircraft altitude and a minimum no BOOM altitude profile, wherein the BOOM impact altitude profile indicates the altitude for the selected speed at which the perceived sound level from the sonic boom is at an acceptable level, and wherein the no BOOM altitude profile indicates the minimum supersonic flight altitude for the selected speed that would result in an acceptable perceived sound level on land; and
    positioning on the graphical display window, for the selected speed, a graphical representation of a flight crew inputted proposed altitude adjustment for flight between a first plurality of the waypoints, and a graphical representation of a modified BOOM impact altitude profile based on the proposed altitude adjustment between the first plurality of the waypoints.

14. The method of claim 13, further comprising:
    positioning on the graphical display window, for a selected altitude, a graphical representation of both a BOOM impact speed profile at the current aircraft speed and a maximum no BOOM speed profile, wherein the BOOM impact speed profile indicates the speed for the selected altitude at which the perceived sound level from the sonic boom is at an acceptable level, and wherein the no BOOM speed profile indicates a maximum supersonic flight speed for the selected altitude that would result in an acceptable perceived sound level on land; and
    positioning on the graphical display window, for the selected altitude, a graphical representation of a flight crew inputted proposed speed adjustment for flight between a first plurality of the waypoints, and a graphical representation of a modified BOOM impact speed profile based on the proposed speed adjustment between the first plurality of the waypoints.

15. The method of claim 14, further comprising:
    receiving by touch gestures via the graphical display window the flight crew inputted proposed altitude adjustment, and the flight crew inputted proposed speed adjustment; and
    displaying, on the aircraft display unit, the flight crew inputted proposed altitude adjustment and the flight crew inputted proposed speed adjustment for flight crew selection for submission for ATC clearance.

16. The method of claim 14, further comprising:
    submitting a new flight plan to ATC for clearance that includes the flight crew inputted proposed altitude adjustment and the flight crew inputted proposed speed adjustment for ATC clearance; and
    submitting, when ATC approval is received, the flight crew inputted proposed altitude adjustment and the flight crew inputted proposed speed adjustment to appropriate flight systems on the aircraft for implementation.

17. The method of claim 13, further comprising determining using the SONIC boom prediction model whether an ATC cleared speed and altitude profile would cause an acceptable BOOM effect per predefined BOOM effect threshold limits during flight between the plurality of waypoints.

18. Non-transitory computer readable media configured by programming instructions configurable to cause a controller to perform a method, the method comprising:
    positioning, for display via a graphical display window on a display unit, a graphical representation of a travel path that includes a waypoint icon for each of a plurality of waypoints along the travel path, a graphical representation of the altitude of terrain underneath the travel path, and an aircraft icon positioned in the graphical display window at a current altitude and a current position relative to the travel path;
    predicting, based on received aircraft sensor inputs from on board aircraft sensors, an optimum speed and altitude profile while flying in a supersonic phase of flight between the plurality of waypoints for a current aircraft model, wind conditions, and mission;
    determining using a SONIC boom prediction model whether the optimum speed and altitude profile would cause an acceptable BOOM effect per a predefined BOOM effect threshold limit during flight between the plurality of waypoints, wherein a BOOM effect is a perceived sound level on land due to unrestricted supersonic flight over land, and wherein a BOOM effect threshold limit is an acceptable perceived sound level on land due to supersonic flight over land;
    positioning on the graphical display window, for a selected speed, a graphical representation of both a BOOM impact altitude profile at the current aircraft altitude and a minimum no BOOM altitude profile, wherein the BOOM impact altitude profile indicates the altitude for the selected speed at which the perceived sound level from the sonic boom is at an acceptable level, and wherein the no BOOM altitude profile indicates the minimum supersonic flight altitude for the selected speed that would result in an acceptable perceived sound level on land; and positioning on the graphical display window, for the selected speed, a graphical representation of a flight crew inputted proposed altitude adjustment for flight between a first plurality of the waypoints, and a graphical representation of a modified BOOM impact altitude profile based on the proposed altitude adjustment between the first plurality of the waypoints.

19. The non-transitory computer readable media of claim 18, wherein the method further comprises:
   positioning on the graphical display window, for a selected altitude, a graphical representation of both a BOOM impact speed profile at the current aircraft speed and a maximum no BOOM speed profile, wherein the BOOM impact speed profile indicates the speed for the selected altitude at which the perceived sound level from the sonic boom is at an acceptable level, and wherein the no BOOM speed profile indicates the maximum supersonic flight speed for the selected altitude that would result in an acceptable perceived sound level on land; and
   positioning on the graphical display window, for the selected altitude, a graphical representation of a flight crew inputted proposed speed adjustment for flight between a first plurality of the waypoints, and a graphical representation of a modified BOOM impact speed profile based on the proposed speed adjustment between the first plurality of the waypoints.

20. The non-transitory computer readable media of claim 19, wherein the method further comprises:
   receiving by touch gestures via the graphical display window the flight crew inputted proposed altitude adjustment, and the flight crew inputted proposed speed adjustment;
   displaying, on the display unit, the flight crew inputted proposed altitude adjustment and the flight crew inputted proposed speed adjustment for flight crew selection for submission for ATC clearance;
   submitting a new flight plan to ATC for clearance that includes the flight crew inputted proposed altitude adjustment and the flight crew inputted proposed speed adjustment for ATC clearance;
   submitting, when ATC approval is received, the flight crew inputted proposed altitude adjustment and the flight crew inputted proposed speed adjustment to appropriate flight systems on the aircraft for implementation; and
   determining using the SONIC boom prediction model whether an ATC cleared speed and altitude profile would cause an acceptable BOOM effect per predefined BOOM effect threshold limits during flight between the plurality of waypoints.

* * * * *